Dec. 31, 1929.  C. S. BRAGG ET AL  1,741,820
BRAKE MECHANISM FOR AUTOMOTIVE VEHICLES
Original Filed Feb. 16, 1928  4 Sheets-Sheet 4

Patented Dec. 31, 1929

1,741,820

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Application filed February 16, 1928, Serial No. 254,647. Renewed May 25, 1929.

Our invention consists in the novel features hereinafter described, reference being had to the accompanying drawings which illustrate several embodiments of the same, selected by us for purposes of illustration, and the said invention is fully disclosed in the following description and claims.

Our invention relates to power actuated mechanism for operating brake mechanism and other devices (as the doors of busses, etc.) of automotive vehicles propelled by an internal combustion engine, having a throttle controlled suction passage for supplying the normal explosive charges to the engine cylinders and having an air inlet for the admission of atmospheric air, which forms the larger part of such explosive charges, in which the rarefication within the suction passage upon which the operation of a suction actuated power actuator, connected with the brake mechanism or other part to be operated, depends, is rendered effective by shutting off, to a greater or less extent, the admission of air to the suction passage of the engine, as by a valve located between the air inlet for the suction passage, and the throttle valve which regulates the speed of the engine in the usual manner, the suction actuated device being connected with the suction passage between said air inlet controlling valve and the throttle valve.

The object of our present invention is to provide both a hand operated device and a foot operated device, and operative connections between said devices and said valves, whereby either may be operated to independently control the throttle valve to regulate the speed of the engine, and whereby the hand operated device may be operated to effect a power stroke of the actuator to apply the brakes and also may be so adjusted as to permit the foot operated device to effect the operation of the actuator as well as the control of the throttle valve, when desired, the said hand operated device being also capable of being set in a position in which the power actuator will not be operated when the operator removes his foot from the foot operated device, while permitting the independent operation of the throttle valve by said foot operated device. The connections between the control devices are also constructed so that the throttle valve will be automatically moved to its closed or idling position before the inlet or actuator controlling valve is moved toward its closed position, and whereby the throttle valve will be opened to a greater or less extent after the said actuator controlling valve has been moved to a predetermined closed position to hasten the production of a desired degree of rarefication in the portion of the suction actuated device connected with the suction passage and in the portion of the suction passage with which the suction actuated device is connected, to effect a quicker operation of the brakes or other devices to be operated, if desired, and to avoid the necessity which would otherwise exist, of withdrawing the air from the suction actuated device, past a closed throttle valve, thus enabling the operator to eliminate, when desired, the time element, which the presence of a closed throttle valve between the suction actuated device and the engine cylinder would otherwise impose.

In carrying out our present invention we prefer to provide means for passing the air exhausted from the power actuator past the carburetor jet nozzle to fuelize said air and convert it into an explosive mixture to prevent stalling the engine if idling, and to provide means for connecting the carburetor float chamber above the liquid level therein with the portion of the suction passage to which the actuator is connected, to equalize pressures above the liquid fuel in the jet nozzle and in the float chamber at all times, to prevent the fuel from being forced out of the jet nozzle into that portion of the suction passage which is subjected to rarefication during the operation of the actuator. These features are not specifically claimed herein, as they are covered by our prior applications for Letters Patent of the United States, Serial No. 185,470 filed April 21, 1927 and Serial No. 190,989 filed May 13, 1927. According to our present invention, we further connect the gravity feed fuel reservoir, where one is provided to supply the fuel, to the float chamber of the carburetor above the liquid level therein and therethrough with said portion of the suction passage. This automatically maintains the three levels of liquid fuel at all times under equal pressure, whether atmospheric or sub-atmospheric, and serves as a vent. By connecting the fuel reservoir above the light level therein with the float chamber, there being no other vent in the same, we prevent the liquid level from rising in the float chamber, which would otherwise occur were the float chamber subjected to rarefication and the fuel in the reservoir under atmospheric pressure.

In the accompanying drawings.

Figures 1, 2, 7:
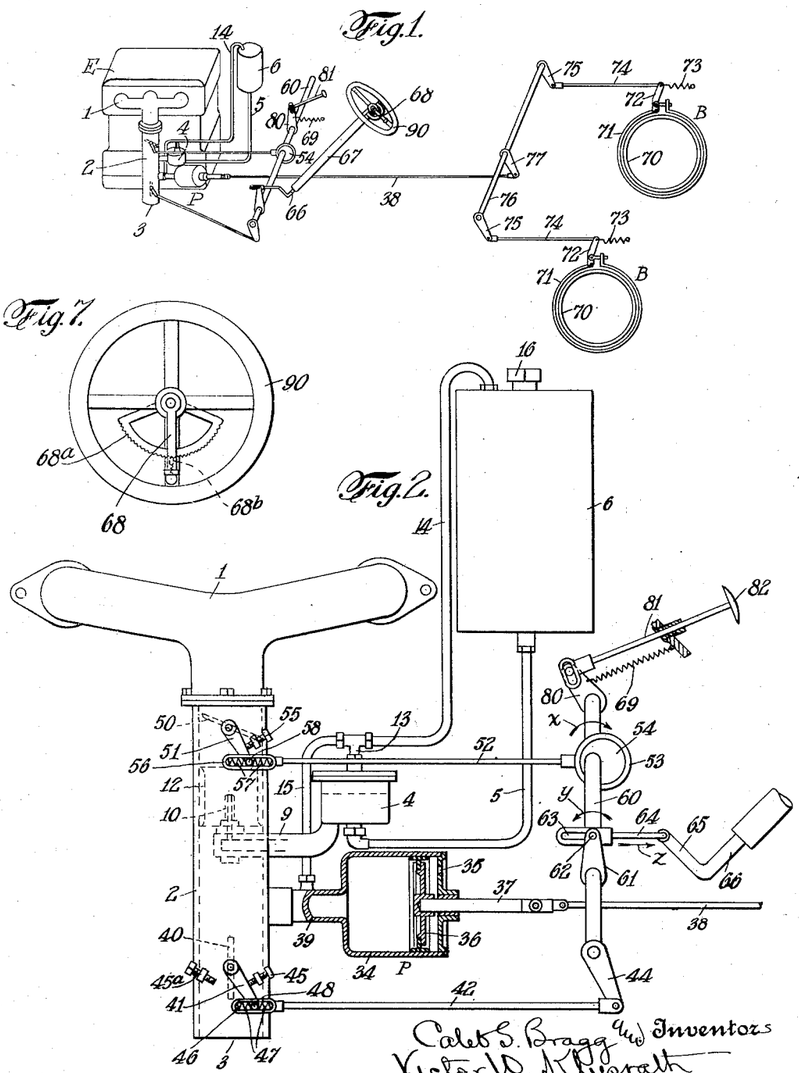
Fig. 1 is a diagrammatic view illustrating an installation in an automotive vehicle provided with an internal combustion engine, and brake mechanism, of a suction actuated device connected with the suction passage of the engine between the air inlet controlling valve and the throttle valve, and embodying our invention.
Fig. 2 is an enlarged detail view representing a suction passage of the engine and associated devices, the power actuator, and the valve controlling devices illustrated in Fig. 1, the parts being shown with the actuator in off or released position.
Fig. 7 is a detail view illustrating one means for retaining the hand operated lever in its adjusted positions.
Figure 3:
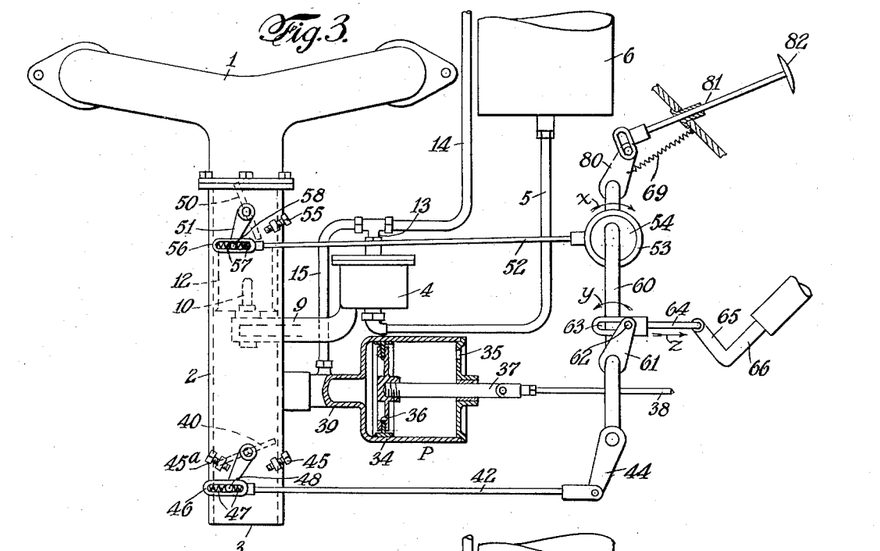
Fig. 3 is a view similar to Fig. 2, showing the valve control devices in position to effect the power stroke of the actuator.

Referring to the form of our invention shown in Figs. 1, 2 and 3, E, represents an internal combustion engine for driving an automotive vehicle, provided with a suction passage, including the intake manifold, 1, and a vertically disposed tubular passage, 2, which is provided at its lower end with an air inlet, 3, for atmospheric air, which forms the larger portion of the explosive mixture for the engine. The suction passage is provided with a carburetor, of which, 4, represents the fluid chamber, provided with a fuel supply pipe, 5, controlled by the usual needle valve and float (not shown), or other means for maintaining a predetermined liquid level in the float chamber, which is connected by a tubular passage, 9, in the usual manner, with a jet nozzle, indicated at 10, discharging within the usual Venturi tube, indicated in dotted lines in Figs. 2 and 3, at 12. 50 represents the usual throttle valve located in the vertical portion of the suction passage above the carburetor nozzle, and provided with an operating arm, 51, which is connected by a link, 52, with a transversely disposed shaft, 60, preferably by means of an eccentric strap, 53, connected with the link, 52, and engaging an eccentric, 54, secured to the shaft. A stop is provided for arresting the throttle valve when in closed or idling position, in which it is shown in Fig. 2, said stop consisting in this instance of an adjustable screw, 55, connected with the wall of the suction passage and engaging the arm, 51. The end of the rod, 52, is preferably provided with a slotted portion, 56, provided with cushioning springs, 57, on opposite sides of a pin, 58, carried by the arm, 51. While it is not absolutely essential that the link or rod, 52, should be connected to the shaft, 60, by an eccentric and strap, we prefer this construction, as it permits the throttle valve to be opened by a rotation of the shaft and eccentric in either direction, and at the same time permits the eccentric to be located intermediate the ends of the shaft.

In Fig. 1, we have shown, diagrammatically, brake mechanisms for the vehicle, which may be of any desired type, and applied to two or more wheels of the vehicle, as preferred. In the present instance the brake mechanisms, indicated as a whole at B—B, are shown as comprising each a brake drum, 70, brake band, 71, brake operating lever, 72, and retracting spring, 73, but the particular construction of the brake mechanism is immaterial. In this instance the brake levers, 72, are shown connected by a link, 74, with arms, 75, on a rock shaft, 76, provided with an operating arm, 77, to which the power actuator is connected. The power actuator, indicated as a whole at P, comprises in this instance, the cylinder, 34, open to the atmosphere at one end, as indicated at 35, and provided with a piston, 36, the piston rod, 37, of which is connected by a link, 38, with the operating arm, 77, of the brake mechanism. The forward end of the actuator cylinder is shown connected by a suction pipe, 39, with the portion, 2, of the suction passage between the air inlet, 3, and the throttle valve, 50, and preferably between the air inlet and the jet nozzle of the carburetor. The vertical portion, 2, of the suction passage adjacent to the air inlet, 3, is provided with an air restricting valve, 40, which, like the throttle valve, is conveniently made of the butterfly type, and is provided with an actuating arm, 41, connected by a link, 42, with a crank arm, 44, on the shaft, 60. The air restricting valve, or brake valve as it may be termed, is provided with a stop for arresting it in the open position, consisting in this instance, of an adjustable screw, 45, connected with the wall of the suction passage engaging the arm, 41, and the end of the rod, 42, is preferably provided with a slotted portion, 46, and provided with cushioning springs, 47, on opposite sides of a pin, 48, connected with the arm, 41.

The shaft, 60, is provided with an operating arm, 61, having a pin, 62, engaging a slit, 63, in a link, 64, connected with a crank arm, 65, on a rod, 66, which conveniently extends through the hollow steering wheel shaft, 67, and is provided at its upper end with a hand operated lever, 68. The shaft, 60, is also provided with a retracting spring for rotating it in the direction of the arrow, X, in Fig. 2, and in this instance we have shown a spring, 69, for this purpose, having one end connected with an arm, 60, secured to the shaft, 60, and having its other end secured to a part connected with the vehicle. The spring, 69, will rotate the shaft, 60, in the direction of the arrow, X, until the pin, 62, on the arm, 61, engages the inner end of the slot, 63, in the link, 64, which limits the movement of the shaft under the action of said spring, 69, variably, according to the position of the link, 64, which is in turn controlled by the hand lever, 68. It will be understood that the hand lever, 68, will be provided with the usual means by which it is held in any position to which it may be adjusted, in accordance with usual automobile practice with respect to the hand operated device carried by the steering wheel shaft. 81 represents a foot operated rod or accelerator which may be provided with the usual mushroom head, 82, and is operatively connected with the rock shaft, 60, so as to rotate the shaft in the direction of the arrow, Y, against the action of the retracting spring, 69, when depressed by the foot, the accelerator rod, 81, being in this instance connected with the arm, 80.

The fuel supply pipe, 5, in this instance is shown connected with a fuel supply tank, 6, supported at a higher level than the float chamber, 4, of the carburetor, from which tank the fuel is fed by gravity to the said float chamber. The fuel reservoir, 6, may be the main reservoir or it may be an auxiliary reservoir supplied with fuel in any manner, from the larger reservoir, not shown, supported below the level of the carburetor.

In order to prevent any variation in the level of the liquid fuel in the jet nozzle, 10, of the carburetor, or in the float chamber, 4, when the air restricting or brake valve, 40, is closed, and rarefication exists in the portion of the suction pipe, 2, between the brake valve and the engine cylinders, we provide means for connecting the gravity fuel reservoir, 6, above the liquid level therein, with the float chamber above the liquid lever therein and with the actuator cylinder forward of its piston, and with the portion of the intake manifold between the air restricting valve and the throttle valve. In this instance we have shown the top of the float chamber, which is closed, provided with a pipe, 13, which in this instance is connected by a pipe, 13, with the reservoir, 6, above the level of the liquid feeding by gravity therefrom to the float chamber, and said pipe, 13, is also connected by a pipe, 15, with the suction pipe, 39, extending from the actuator cylinder, 34, to the suction passage between the brake valve and the throttle valve thereof. It will be obvious that when the air restricting valve, 40, is open, the float chamber and reservoir are vented to the atmosphere, and when the air restricting valve is closed, the air will be simultaneously withdrawn from the brake cylinder, and also from the reservoir, 6, and from the float chamber equally above the liquid levels therein, and therefore that the normal head of the fuel supply will be maintained at the needle valve of the carburetor float chamber and the level of the gasoline in the float chamber and in the nozzle, 10, will not rise. The reservoir, 6, is in this instance shown provided with a removable filling cap, 16, for refilling the reservoir, which cap normally closes the filling aperture and is removed when the reservoir is to be filled.

It will be understood that if the reservoir is an auxiliary gravity reservoir, automatically filled by suction from the manifold, from a supply tank below the level of the carburetor in a well known way, the filling aperture will be connected with the supply tank and the reservoir will be connected with the manifold of the engine, under the control of automatic valve mechanism, which constructions are maintained in closed position, by suitable automatic valve mechanism operated by a float, which simultaneously closes the connection to the suction passage of the engine and the main gasoline supply tank, and opens the vent connection with the atmosphere. As this self-filling means has no bearing on our invention, it will not be particularly illustrated or described.

The parts being constructed and arranged as hereinbefore described, and being in the positions indicated in Fig. 1, and Fig. 2, the hand operated brake lever, 68, being held in such position as to arrest the rock shaft, 60, in position to hold the throttle valve, 50, in closed or idling position, and the air restricting valve, 40, open position, it will be seen that the operator, by depressing the accelerator, 81, can effect the rotation of the shaft, 60, in the direction indicated by the arrow, Y, which will rotate the eccentric, 54, in the same direction, and effect the opening of the throttle valve and accelerating of the engine to the desired extent. Such movement of the shaft, 60, will also move the arm, 44, rearwardly, or to the right in Fig. 2, but as the arm, 41, of the air restricting valve, 40, is arrested by the adjustable stop, 45, the valve, 40, will not be operated and the only effect of the movement of the arm, 44, will be to compress one of the springs, 47, and relax the other. The pin, 62, on the arm, 61, will be moved in the direction of the arrow, Y, in the slot, 63, which is of sufficient length to permit the throttle valve to be moved to fully open position. The operator can also open the throttle valve to any desired extent by operating the hand lever, 68, on the steering wheel in such a direction as to rotate the shaft, 60, in the direction of the arrow, Y, to increase the speed of the engine and by restoring the hand lever, 68, to its neutral position, permitting the shaft, 60, to be rotated in the reverse direction, indicated by the arrow, X, and the spring, 69, can effect the closing of the throttle valve. The operator can, therefore, control the throttle valve by the accelerator, 82, and also by the hand operated lever, 68, in the same manner as is customary in the operation of automotive vehicles and upon releasing the accelerator, or returning the hand operated lever to its neutral position, the spring, 69, will restore the shaft, 60, and connected parts, to normal position, in which it will be held by the engagement of the pin, 62, with the end of the slot, 63 in the link, 64.

If the operator desires to apply the brake mechanism, he may do so by rotating the hand operated lever, 68, in a direction to retract the link, 64, in the direction of the arrow, Z, Fig. 2, thereby permitting the rock shaft, 60, to be rotated in the direction of the arrow, X, by the spring, 69, and through the arm, 44, effecting the closing of the air restricting valve, 40, as indicated in Fig. 3. The eccentric, 54, is so placed on the shaft, 60, that the first portion of this movement will cause it to pass through its dead center without operating the throttle valve until after the air restricting or brake valve, 40, closes, after which the further movement of the rock shaft, 60, in the direction of the arrow, X, will begin to effect the opening of the throttle valve and compression of the spring, 47. As soon as the air restricting valve, 40, begins to close, rarefication is effected within the suction passage of the engine between said valve and the throttle valve, and air will be withdrawn from the actuator cylinder, 34, into the engine cylinders, through the suction pipe, 30, suction passage, 2, and past the closed throttle valve which has sufficient opening at all times to permit the passage of sufficient air to keep the engine running, and atmospheric pressure on the rear face of the piston, 36, will cause it to move forward and apply the brake mechanism. The evacuation of the cylinder, 34, can be expedited, as previously stated, after the closing of the air restricting or brake valve, 40, by a further movement of the shaft, 60, to open the suction valve to a greater or less extent, to avoid the delay which would otherwise be caused by the withdrawal of this air from the suction actuated device past the closed throttle valve. Means are provided for arresting the air restricting or brake valve when it arrives at the predetermined closed position. This may be accomplished by the engagement of the valve, 40, with the wall of the suction passage, or by providing an additional adjustable stop, 45$^a$, for engaging the arm, 41, as indicated in Figs. 2 and 3, and it will be understood that as soon as the closing movement of the air restricting or brake valve is effected, the further rotation of the shaft, 60, to effect the opening of the throttle valve, 50, will of course impart further movement to the arm, 44, which is permitted by the slot, 46, at the forward end of the link, 42, one of the springs, 47, being compressed and the other expanded during this over-movement of the arm, 44, without further effecting the air restricting or brake valve, 40, or bringing undue strain on the parts. The stop, 45$^a$, can be adjusted to secure any desired and predetermined closed position of the air restricting or brake valve, 40, so that there will be no danger of stalling the engine by entirely cutting off the supply of air to the suction passage, after the air has been exhausted from the actuator. The air exhausted from the actuator in passing the jet collects liquid fuel and enters the cylinders as an explosive mixture to increase the speed of the motor if the clutch is disengaged and further expedites the withdrawal of air.

The brake mechanism can be released by reversing the operation of the hand lever, 68, so as to rotate the shaft, 60, in the direction of the arrow, Y, back to its neutral position, indicated in Fig. 1, thereby first closing the throttle valve, if it has been opened, and thereafter opening the air restricting or brake valve, 40, permitting inflow of air at atmospheric pressure into the suction passage between the air restricting valve and the throttle valve, portions of which air will enter the cylinder, 34, through the suction pipe, 39, immediately increasing the pressure in the cylinder of the actuator, forward of the piston, to equalize pressures on opposite faces of the piston, permitting an immediate release of the brakes, and the brake mechanism, and the piston will be returned to their off or released positions by the retracting means for the brake mechanism.

It will be seen that if the hand throttle is left in what we will term the braking position, that is to say, the position which will permit the movement of the shaft, 60, in the direction of the arrow X, under the action of the spring, 69, to the extent indicated in Fig. 3, for example, the operator may control not only the throttle valve, but also the brake mechanism by means of the foot accelerator. The parts being in the position shown in Fig. 3, the operator, by pressing on the foot throttle or accelerator, can first close the throttle valve and open the air restricting or brake valve, restoring the parts to the position indicated in Fig. 2, with the exception of the link, 64, will be in a more rearward position than is shown in Fig. 2, and the pin, 62, will be at an intermediate point in the slot, 63. By pressing the foot accelerator further forward the operator can open the throttle valve to any desired extent to accelerate the speed of the engine and the vehicle, and by releasing the pressure on the foot throttle, he can bring the throttle valve to the idling position indicated in Fig. 2, without applying the brakes, and by further relieving his pressure on the accelerator, he can effect the closing of the air restricting or brake valve, and thereafter permit the throttle valve to open, to more quickly exhaust the air from the brake cylinder, as previously described. According to our invention, therefore, the brake mechanism is under the joint control of the hand and foot actuated devices and the operator may control the speed of the vehicle and also apply the brakes by either means and may furthermore set the hand throttle in such position as indicated in Fig. 2, for example, that the brakes will not be operated when the driver removes his foot from the accelerator pedal. The degree of rarefication within the actuator may be varied, according to the amount of opening of the air restricting or brake valve with respect to the closed position of the throttle valve, and the brakes may be held applied for any period of time with the full power of the actuator or any lesser amount of force, as desired.

If the vehicle has been brought to a full stop while ascending an incline and it is desired to re-start the vehicle by accelerating the motor before the brakes are fully released, it is obvious that the operator can do so by first releasing the accelerator lever or pedal, to produce a maximum degree of rarefication within the actuator cylinder and suction passage, and then quickly depressing the accelerator to effect an approximately simultaneous opening of the throttle valve and air restricting valve, whereby a portion of the air admitted by the opening of the brake valve will be fuelized and drawn into the engine cylinders to increase the speed of the engine before the degree of rarefication within the actuator cylinder can be completely reduced, as the area of the intake passage is approximately equal throughout its entire length and it is not large enough to instantly admit enough air to supply the engine with explosive mixture and at the same time refill the suction pipe and actuator cylinder under the conditions just mentioned, and therefore, there would be a lag in the release of the brakes sufficient to permit the motor to obtain sufficient speed to start the car, without danger of stalling or permitting the car to roll backwards.

When the hand throttle is in the braking position and both throttle and brakes are under the control of the operator through the foot accelerator, as before described, it will be obvious that should the operator be seized with sudden illness or be stricken with sudden death, the removal of the pressure of his foot from the accelerator would automatically close the throttle valve and apply the brakes, thus obviating what might otherwise result in a serious accident.

It will be seen that when the air restricting or brake valve is closed, air will be withdrawn simultaneously from the brake cylinder and also from the gasoline reservoir above the liquid level therein and from the float chamber above the liquid level therein equally, and the normal head of the gasoline will therefore be maintained at the needle valve of the float chamber so that the level of the gasoline and float chamber, and therefore the level of the liquid fuel in the nozzle, 10, will not rise, but will remain constant under variations in the rarefication within the suction passage of the engine so that the operation of the carburetor will not be disturbed by the operation of the power actuator and flooding of the carburetor and of the suction passage is prevented.

It is obvious that both the brake and throttle valve could be located between the carburetor and the engine cylinders, in which case the pipes to the float chamber and gasoline reservoir would not be necessary as the jet would always be subjected to approximately atmospheric conditions except for the customary action of the venturi, but this construction is objectionable where a large size power actuator is used in that the motor may be stalled by the air exhausted from the actuator, which will, in this construction, not receive any fuel from the jet.

For purposes of illustration, we have shown in Fig. 7, one means for locking or holding the hand operated lever, 68, on the steering wheel in any position to which it may be adjusted. In this figure, the column for the steering wheel, indicated at 90, is provided with a segment, 68ª, having a mulled or serrated edge, and the hand operated lever, 68, is provided with a spring pressed locking pawl, or member, indicated at 68ᵇ, for engaging the serrated portion of the segment, 68ª. The lever, 68, is shown in neutral position in Fig. 7, corresponding with its position in Figs. 1 and 2, and it will be understood that the engagement of the serrated portion of the segment and the yieldingly supported pawl, 68ᵇ, will be such as to permit the lever to be moved in either direction, but will hold said lever in any position to which it may be adjusted.

Figure 4:
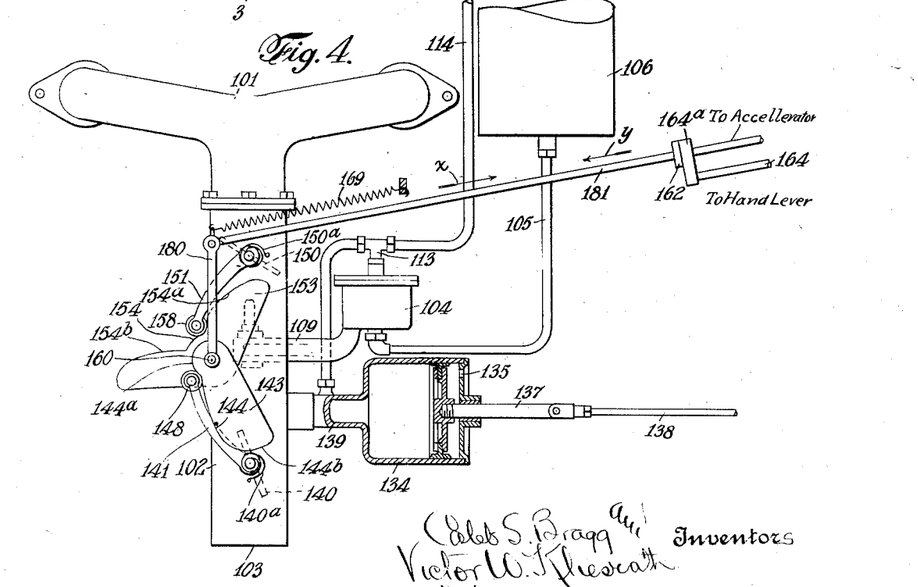
Fig. 4 is a view similar to Fig. 2, illustrating a modification of our invention.
Figure 5:
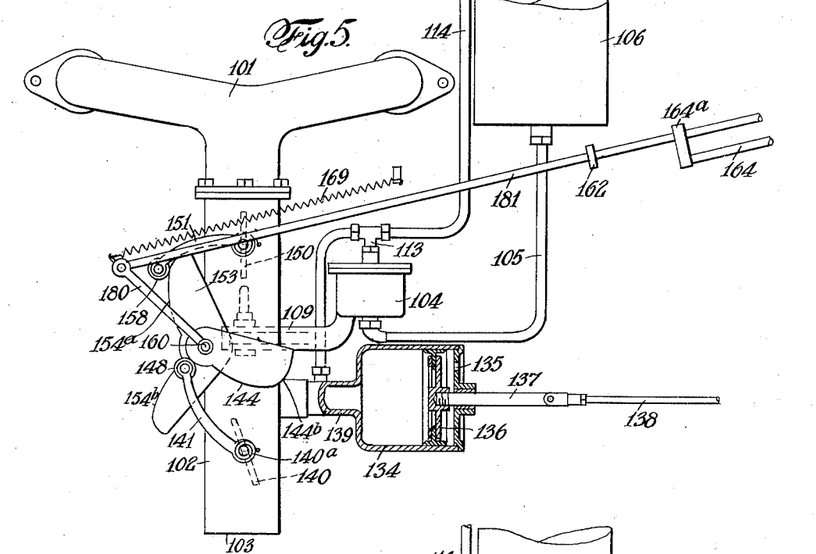
Fig. 5 is a view similar to Fig. 4, showing the valve actuating devices in position to effect the opening of the throttle valve for the control of the engine without operating the inlet valve controlling the actuator.
Figure 6:
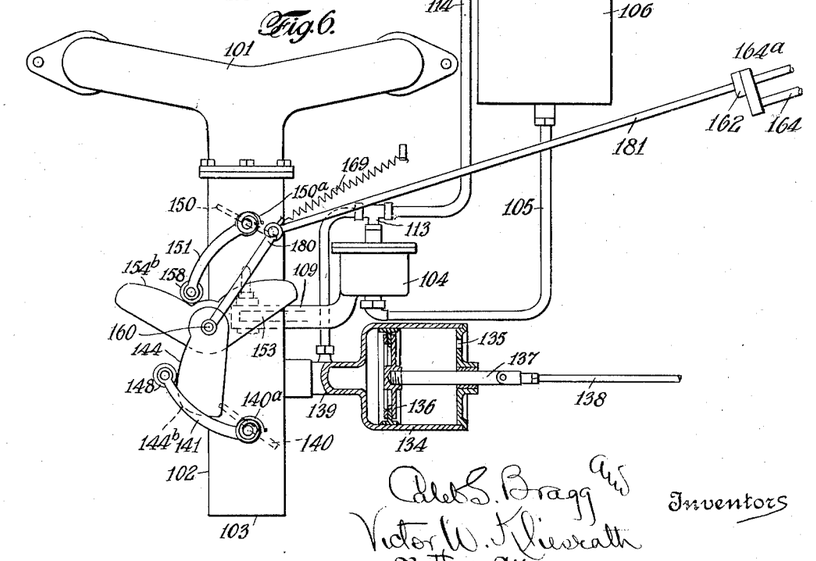
Fig. 6 is a view similar to Fig. 4, showing the parts in position to effect the power stroke of the actuator.

In Figs. 4, 5 and 6, we have shown a slight modification of our invention, in which the parts corresponding to those shown in Figs. 1 to 3 inclusive, and hereinbefore described, are given the same reference characters with the addition of 100 to avoid repetition. In this instance we have shown a short controlling rock shaft, indicated at 160, mounted adjacent to the suction passage, 102, of the engine, and provided with cams for actuating the throttle valve, 150, and air restricting or brake valve, 140, as hereinafter described. 153 represents a cam on the shaft, 160, for operating the throttle valve, and constructed to engage friction roller, 158, on the arm, 151, connected with the throttle valve. The cam, 153, is provided with a concentric portion, or dwell, indicated at 154, and with the cam grades, 154ª and 154ᵇ, extending in opposite directions from the dwell, 154. In the normal or neutral position of the parts indicated in Fig. 4, the roller, 158, will occupy the position at the intersection of the dwell, 154, with the cam grade, 154ª, and the throttle valve, 150, will be in its predetermined closed position for idling. The shaft, 160, is also provided with a second cam, 143, for operating the air restricting or brake valve, 140. This cam is provided with a concentric portion, or dwell, indicated at 144ª, and a second dwell, 144ᵇ, having all portions thereof concentric with the shaft, 160, but disposed at a greater distance therefrom than the dwell, 144. The cam, 143, acts in conjunction with a friction roller, 148, on an arm, 141, operatively connected with the brake valve, 140. In the normal or neutral position of the parts shown in Fig. 4, the roller, 148, will engage the cam, 143, at the intersection of the dwell, 144ª, and the grade, 144. The throttle valve, 150, is provided with a retracting spring, 150ª, in this instance a spiral spring, which tends to move the throttle valve in a direction to close it and also holds the roller, 158, at all times in engagement with the cam, 153. The air restricting or brake valve, 140, is also provided with a similar spring, 140ª, which tends to return the valve to open position, and also serves to hold the roller, 148, at all times in engagement with the cam, 143.

The shaft, 160, is provided with an operating arm, indicated at 180, to which a retracting spring, 169, is connected, and said lever is operatively connected with both the foot accelerator and the hand lever, preferably located on the steering wheel, as heretofore described. In this instance the lever, 180, is connected by the foot lever, by rod, 181, provided with a stop indicated at 162. A rod, 164, connected with the hand lever, is provided with a lug, 164ª, having a sliding engagement with the rod, 181, and being engaged by the stop, 162, as indicated in Fig. 4, when the hand lever is in the neutral position, thus holding the parts in position to maintain the throttle valve closed and the brake valve open. The opening of the throttle valve to accelerate the speed of the engine and the vehicle may be effected by either the accelerator or the hand lever. It will be noted that if the accelerator is depressed so as to move the rod, 181, in the direction of the arrow, Y, (to the left in Fig. 4) the shaft, 160, will be rotated so as to carry the roller, 158, onto the cam grade, 154ª, and gradually effect the opening of the throttle valve, as shown in Fig. 5, while this movement will cause the roller, 148, to merely follow the concentric portion or dwell, 144, of the cam, 143, without producing any movement of the arm, 141, so that the air restricting or brake valve, 140, remains in open position. On releasing the accelerator, the shaft, 160, and cams will be rotated in the opposite direction under the influence of the retracting spring, 169, permitting the throttle valve to return to closed position. It will also be seen that the throttle valve can be controlled by the hand lever, by moving it from neutral position, so as to cause the rod, 164, connected therewith, to move in the direction of the arrow, Y, Fig. 4, the lug, 164ª, engaging the stop, 162, and effecting the movement of the throttle valve without operating the brake valve, in the manner just described. To apply the brake mechanism, the operator will throw the hand lever in the opposite direction from its neutral position, so as to withdraw the lug, 164ª, from the stop, 162, and permit the rod, 181, to be moved in the direction of the arrow, X (to the right in Fig. 4) under the action of the retracting spring, 169. This effects rotation of the shaft, 160, to carry the roller, 148, from the dwell, 144ª, to the grade, 144, of the cam, 143, thereby effecting the closing of the air restricting or brake valve, as indicated in Fig. 6, and applying the brake mechanism, in the manner hereinbefore described. During this movement, the corresponding movement of the cam, 153, will cause the roller, 158, to pass over the concentric portion, or dwell, 154, without moving the throttle valve, which remains in its closed position. When, however, the air restricting or brake valve, 140, has been fully closed, as indicated in Fig. 6, the roller, 148, will be in position to pass onto the second dwell, 144$^b$, of the cam, 143, and the roller, 158, will be in position to pass onto the second cam grade, 154$^b$, of the cam, 153, so that a further movement of the rod, 181, in the direction of the arrow, X, will effect a gradual opening of the throttle valve by the cam grade, 154$^b$, without any further movement of the air restricting or brake valve, 140, which remains in its closed position. It will thus be seen that the throttle valve may be opened after the air restricting or brake valve has been closed, to expedite the exhaustion of the air from the brake cylinder, 134.

It will also be seen that if the hand throttle is left in the braking position, that is to say, with the rod, 164, and stop, 164$^a$, retracted, as shown in Fig. 6, the operator can control both the throttle valve and the brakes by the foot accelerator. By depressing the accelerator and moving the rod, 181, in the direction of the arrow, Y, the brake mechanism may be released, and the further movement of the accelerator and rod, 181, will open the throttle valve and permit the speed of the engine and vehicle to be controlled by the accelerator, while, by releasing the accelerator past the normal or neutral position indicated in Fig. 4, permitting the cams to be rotated further, in a rearward direction, as indicated in Fig. 6, under the action of the retracting spring, 169, the brakes may be applied by the accelerator. The construction illustrated in Figs. 4, 5 and 6, therefore, operates substantially in the same manner as that shown in Figs. 1, 2 and 3, to effect the same results, and in the construction shown in Figs. 4, 5 and 6, if the hand lever is in the braking position, the removal of the foot of the operator from the accelerator in case of illness or death while controlling the throttle valve to accelerate the engine, will effect the closing of the throttle and the application of the brake mechanism, as previously described.

Figure 8:
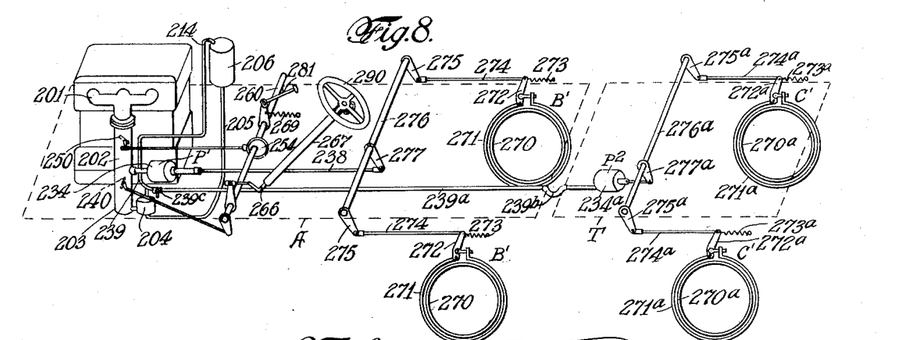
Fig. 8 is a diagrammatic view, similar to Fig. 1, showing the main automotive vehicle provided with a trailer propelled thereby and having its brake mechanism operated by a suction actuated device connected with the suction passage of the engine between the air inlet controlling valve and the throttle valve, and controlled by the valve mechanism on the main or tractor vehicle.

It is obvious that the valve controlling mechanism and valves hereinbefore described may be employed to effect the operation of a power actuator located on a trailing vehicle, where this is desired for the application of the brake mechanism for the wheels of the trailer, and in Fig. 8 we have shown, diagrammatically, an installation of this character. In this figure the parts corresponding to those shown in Figs. 1, 2 and 3, are given the same reference characters with the addition of 200. In Fig. 8, the main vehicle or tractor is indicated in dotted lines by the letter A, and a trailing vehicle, adapted to be propelled thereby, is indicated in dotted lines at T. The brake mechanisms for the main vehicle are indicated at B', B'. The trailer is provided with similar brake mechanisms, indicated at C', C', connected for joint operation with a rock shaft, 276$^a$. The main vehicle is constructed in the same manner as the vehicle indicated in the diagram, Fig. 1, the description of which need not be repeated, the said vehicle being provided with a power actuator, indicated at P', operatively connected with the brakes, B', B', of the main vehicle, and operating in the manner hereinbefore described. The trailing vehicle, T, is shown provided with an additional power actuator, indicated at P$^2$, the piston of which is connected with an operating arm, 277$^a$, on the rock shaft, 276$^a$, for operating the brake mechanisms, C', C', of the trailer. The cylinder, 234$^a$, of the power actuator, P$^2$ is connected by a suction pipe, 239$^a$, having a flexible portion, 239$^b$, extending from one vehicle to the other, with the suction passage of the engine between the brake valve, or air restricting valve, 240, and the throttle valve, 250, and being in this instance connected to the suction pipe, 239, from the cylinder, 234, of the actuator, P', to the suction passage. It will be obvious that when the valve mechanism is operated, as hereinbefore described, to effect the power stroke of the actuators, the brake mechanism of both vehicles will be applied, substantially simultaneously. The suction pipe, 239$^a$, is shown provided with a cut off cock, 239$^c$, for closing it when the trailer is disconnected from the tractor vehicle, or the brake mechanisms of the trailer are otherwise not intended to be used.

Figures 9, 10, 11:
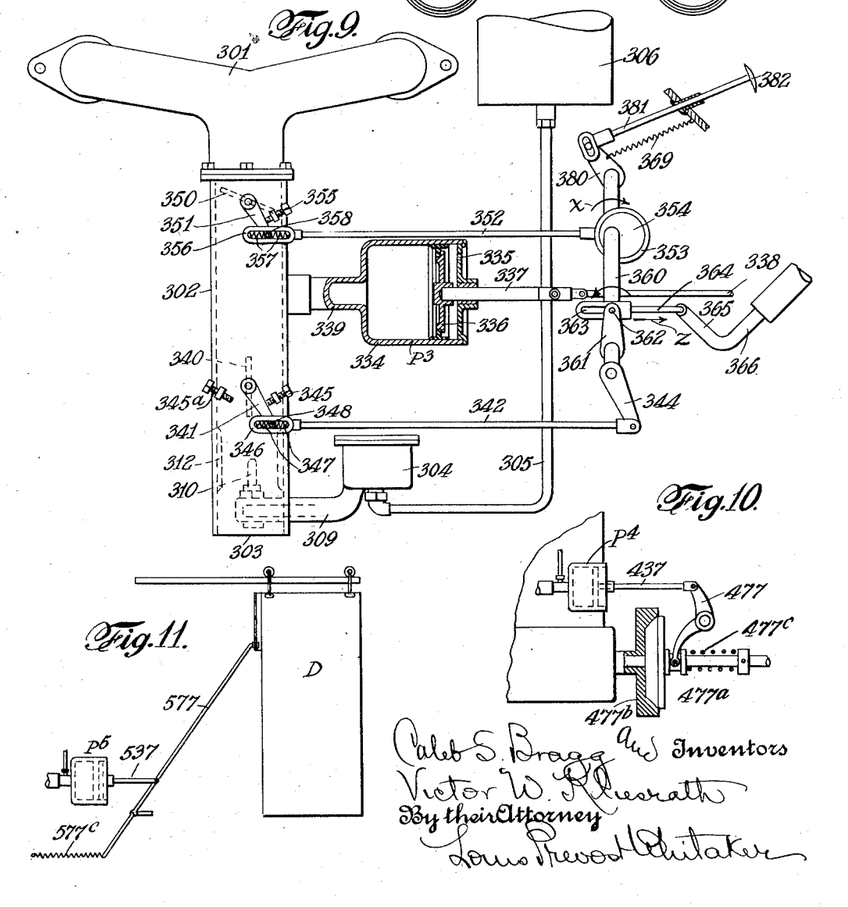
Fig. 9 is a view similar to Fig. 2, showing a modification of our invention in which both the brake valve and throttle valve are located between the carburetor and the engine cylinder.
Fig. 10 is a detail view illustrating the manner in which the suction actuated device may be connected with a clutch on the engine shaft for operating the same.
Fig. 11 is a detail view illustrating the application of the suction actuated device for the operation of a sliding door for the vehicle.

In Fig. 9 we have illustrated another slight modification of our invention, in which both the brake valve and the throttle valve are located in the suction passage between the carburetor jet nozzle and the engine cylinders. In this construction the parts corresponding with those previously described with reference to Figs. 1, 2 and 3, are given the same reference numerals with the addition of 300, to avoid repetition. As indicated in Fig. 9, the suction passage, 302, of the engine leading to the intake manifold, 301, is provided with the throttle valve, 350, and brake valve or air restricting valve, 340, the vertical portion of the suction passage extending below the brake valve, and the jet nozzle, 310, of the carburetor, 304, being located below the air restricting valve, 340. In this case it would be unnecessary to connect the float chamber above the liquid level and the gasoline reservoir, 306, above the liquid level with each other and with the suction passage of the engine between the brake valve and throttle valve, as the jet nozzle would always be subjected to approximately atmospheric pressure, except for the operation of the Venturi tube, indicated at 312. This construction, however, would not be desirable where a large sized power actuator or several power actuators are employed, for the reason that the air exhausted from the actuator, or actuators, would not be fuelized and would be likely to interfere with the operation of the engine, or stall it if idling. So far as the suction actuated device is concerned, it would operate in the manner hereinbefore described.

It will be understood that the power actuators connected and operating as hereinbefore described, might be connected with other mechanisms than brake mechanisms, if desired. For example, in Fig. 10, we have shown the power actuator, P⁴, having its piston rod, 437, connected with a clutch operating lever, 477, operatively connected with a movable member, 477ª, of a clutch on the engine shaft, normally held in operative relation with the fixed member, 477ᵇ, by a spring, 477ᶜ.

In Fig. 11, the actuator, indicated at P⁵, has its piston rod, 537, connected with a lever, 577, one end of which is connected with a sliding door, D, for the vehicle, said lever being provided with the usual retracting spring, indicated at 577ᶜ.

What we claim and desire to secure by Letters Patent is:—

1. In automotive vehicles, the combination with an internal combustion engine for propelling the same having a suction passage, an air inlet for supplying the air for the explosive mixture having an air restricting valve, a carburetor for fuelizing said air, and a throttle valve for said suction passage interposed between said carburetor and the engine cylinders, of a suction actuated device, connections therefrom to a part to be operated, a tubular suction connection from said suction actuated device connected with said suction passage between said throttle valve and said air inlet, a normally open air restricting valve for said suction passage interposed between said suction connection and said air inlet, two independent operator operated parts, means for connecting each of said operator operated parts with said throttle valve and air restricting valve, constructed to open the throttle valve without closing the air restricting valve, to control the speed of the engine and to effect the closing of the air restricting valve after the throttle valve is closed to create rarefication within said suction actuated device for effecting the operation thereof.

2. In automotive vehicles, the combination with an internal combustion engine for propelling the same having a suction passage, an air inlet for supplying the air for the explosive mixture having an air restricting valve, a carburetor for fuelizing said air, and a throttle valve for said suction passage interposed between said carburetor and the engine cylinders, of a suction actuated device, connections therefrom to a part to be operated, a tubular suction connection from said suction actuated device connected with said suction passage between said throttle valve and said air inlet, two independent operator operated parts, means for connecting each of said operator operated parts with said throttle and air restricting valves, constructed to open the throttle valve without closing the air restricting valve, to control the speed of the engine and to effect the closing of the air restricting valve after the throttle valve is closed, to create rarefication within said suction actuated device for effecting the operation thereof.

3. In automotive vehicles, the combination with an internal combustion engine for propelling the same having a suction passage, an air inlet for supplying the air for the explosive mixture having an air restricting valve, a carburetor for fuelizing said air, and a throttle valve for said suction passage interposed between said carburetor and the engine cylinders, of a suction actuated device, connections therefrom to a part to be operated, a tubular suction connection from said suction actuated device connected with said suction passage between said throttle valve and said air inlet, a hand operated part, a foot operated part, and connections from each of said parts to the throttle valve and air restricting valve, constructed to effect the opening of the throttle valve without closing the air restricting valve to control the speed of the engine and to effect the closing of the air restricting valve after the closing of the throttle valve, to effect the operation of the part to be operated by said suction actuated device.

4. In automotive vehicles, the combination with an internal combustion engine for propelling the same having a suction passage, an air inlet for supplying the air for the explosive mixture having an air restricting valve, a carburetor for fuelizing said air, and a throttle valve for said suction passage interposed between said carburetor and the engine cylinders, of a suction actuated device, connections therefrom to a part to be operated, a tubular suction connection from said suction actuated device connected with said suction passage between said throttle valve and said air inlet, a hand operated part, a foot operated part, and connections from each of said parts to the throttle valve and air restricting valve, constructed to effect the opening of the throttle valve without closing the air restricting valve to control the speed of the engine and to effect the closing of the air restricting valve after the closing of the throttle valve, to effect the operation of the part to be operated by said suction actuated device, said connections being constructed to effect the opening of the throttle valve after the closing of the air restricting valve, to expedite the withdrawal of air from the suction actuated device and the operation of the part to be operated at maximum power.

5. In a brake system for vehicles, the combination with an internal combustion engine for propelling the vehicles, having a suction passage provided with an air inlet for supplying the air for the explosive mixture, a carburetor for fuelizing said air, and a throttle valve for said suction passage interposed between said carburetor and the engine cylinders, of a suction actuated device, connections therefor, to the brake mechanism, a tubular suction connection from the said suction actuated device connected with said suction passage between the throttle valve and said air inlet, a normally open air restricting valve for said suction passage interposed between said suction connection and said air inlet, two independent operator operated parts, means for connecting each of said operator operated parts with the throttle valve and with the air restricting valve constructed to open the throttle valve without closing the air restricting valve, to control the speed of the engine and vehicle, and to effect the closing of the air restricting valve after the throttle valve is closed, to effect the application of the brake mechanism by the suction actuated device.

6. In a brake system for automotive vehicles, the combination with an internal combustion engine for propelling the vehicle or vehicles, having a suction passage provided with an air inlet for supplying the air for the explosive mixture, a carburetor for fuelizing said air, and a throttle valve for said suction passage interposed between said carburetor and the engine cylinders, of a suction actuated device, connections therefrom to brake mechanism, a tubular suction connection from the said suction actuated device connected with said suction passage between the throttle valve and said air inlet, a normally open air restricting valve for said suction passage interposed between said suction connection, and said air inlet, two independent operator operated parts, means for connecting each of said operator operated parts with the throttle valve and with the air restricting valve constructed to open the throttle valve without closing the air restricting valve, to control the speed of the engine and vehicle, and to effect the closing of the air restricting valve after the throttle valve is closed, to effect the application of the brake mechanism by the suction actuated device, said connections being constructed to effect the opening of the throttle valve after the closing of the air restricting valve, to expedite withdrawal of air from the suction actuated device and the application of the brake mechanism at maximum power.

7. In a brake system for automotive vehicles, the combination with an internal combustion engine for propelling the vehicle or vehicles, having a suction passage provided with an air inlet for supplying the air for the explosive mixture, a carburetor for fuelizing said air, and a throttle valve for said suction passage interposed between said carburetor and the engine cylinders, of a suction actuated device, connections therefrom to brake mechanism, a tubular suction connection from the said suction actuated device connected with said suction passage between the throttle valve and said air inlet, a normally open air restricting valve for said suction passage interposed between said suction connection and said air inlet, a hand operated part, a foot operated part, and connections from each of said parts to the throttle valve and restricting valve constructed to effect the opening of the throttle valve without closing the air restricting valve, to control the speed of the engine and vehicle, and to effect the closing of the air restricting valve after the closing of the throttle valve, to effect the application of the brakes by said suction actuated device.

8. In a brake system for automotive vehicles, the combination with an internal combustion engine for propelling the vehicle or vehicles having a suction passage provided with an air inlet for supplying the air for the explosive mixture, a carburetor for fuelizing said air, and a throttle valve for said suction passage interposed between said carburetor and the engine cylinders, of a suction actuated device, connections therefrom to brake mechanism, a tubular suction connection from the said suction actuated device connected with said suction passage between the throttle valve and said air inlet, a normally open air restricting valve for said suction passage interposed between said suction connection and said air inlet, a hand operated part, a foot operated part, and connections from each of said parts to the throttle valve, and air restricting valve, constructed to effect the opening of the throttle valve without closing the air restricting valves, to control the speed of the engine and vehicle, and to effect the closing of the air restricting valve after the closing of the throttle valve, to effect the application of the brakes by said suction actuated device, said connections being constructed to effect the opening of the throttle valve after the closing of the air restricting valve, to expedite the withdrawal of air from the suction actuated device and the application of the brake mechanism at maximum power.

9. In a brake system for automotive vehicles provided with brake mechanism, the combination with an internal combustion engine for propelling the vehicle or vehicles, having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said suction actuated device to the brake mechanism, a tubular suction connection from the said cylinder connected with said suction passage between the throttle valve and said air inlet, a normally open air restricting valve for said suction passage interposed between said suction connection and said air inlet, valve actuating means connected with the throttle valve and with the air restricting valve, and operable in one direction to effect the opening of the throttle valve without closing the air restricting valve to control the speed of the engine and vehicle, and in the opposite direction to effect the closing of the air restricting valve after the throttle valve is closed to apply the brake mechanism by the suction actuated device, and an operator operated part connected with said valve actuating means.

10. In a brake system for automotive vehicles provided with brake mechanism, the combination with an internal combustion engine for propelling the vehicle or vehicles, having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said suction actuated device to the brake mechanism, a tubular suction connection from the said cylinder connected with said suction passage between the throttle valve and said air inlet, a normally open air restricting valve for said suction passage interposed between the suction connection and said air inlet, valve actuating means connected with the throttle valve and with the air restricting valve, and operable in one direction to effect the opening of the throttle valve without closing the air restricting valve to control the speed of the engine and vehicle, and in the opposite direction to effect the closing of the air restricting valve after the throttle valve is closed, to apply the brake mechanism by the suction actuated device, and thereafter open the throttle valve to expedite the withdrawal of air from the cylinder of the suction actuated device and the application of the brake mechanism at maximum power, and an operator operated part connected with said valve actuating means.

11. In a brake system for automotive vehicles provided with brake mechanism, the combination with an internal combustion engine for propelling the vehicle or vehicles, having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said suction actuated device to the brake mechanism, a tubular connection from the said cylinder connected with said suction passage between the throttle valve and said air inlet, a normally open air restricting valve for said suction passage interposed between said suction connection and said air inlet, valve actuating means connected with the throttle valve and with the air restricting valve and operable in one direction to effect the opening of the throttle valve without closing the air restricting valve to control the speed of the engine and vehicle, and in the opposite direction to effect the closing of the air restricting valve after the throttle valve is closed to apply the brake mechanism by the suction actuated device, a foot operated part connected with said valve actuating means, and a separate hand operated part connected with said valve actuating means, the connections from one of said parts to said valve actuating means containing a provision for lost motion.

12. In a brake system for automotive vehicles provided with brake mechanism, the combination with an internal combustion engine for propelling the vehicle or vehicles, having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said suction actuated device to the brake mechanism, a tubular suction connection from the said cylinder connected with said suction passage between the throttle valve and said air inlet, a normally open air restricting valve for said suction passage interposed between said suction connection and said air inlet, a valve actuating means connected with the throttle valve and with the air restricting valve, and operable in one direction to effect the opening of the throttle valve without closing the air restricting valve to control the speed of the engine and vehicle, and in the opposite direction to effect the closing of the air restricting valve after the throttle valve is closed to apply the brake mechanism by the suction actuated device, and thereafter open the throttle valve to expedite the withdrawal of air from the cylinder to the suction actuated device and the operation of the brake mechanism, a foot operated part connected with said valve actuating means, and a separate hand operated part connected with said valve actuating means, the connections from one of said parts to the valve actuating means containing a provision for lost motion.

13. In a brake system for automotive vehicles, provided with brake mechanism, the combination with an internal combustion engine for propelling the vehicle or vehicles, having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said suction actuated device to the brake mechanism, a tubular suction connection from the said cylinder connected with said suction passage between the throttle valve and said air inlet, a normally open air restricting valve for said suction passage interposed between the suction connection and said air inlet, a valve operating means for the throttle valve including an oscillating part for effecting the opening of the throttle valve by a movement in either direction, and having a limited amount of movement in an intermediate position between its extremities of movement, without effecting the opening of the throttle valve, an oscillating part operatively connected with the air restricting valve and connected with the first mentioned oscillating part, to effect the closing of the air restricting valve during the limited ineffective movement of said first mentioned oscillating part, and an operator operated part connected with both of said oscillating parts.

14. In a brake system for automotive vehicles, provided with brake mechanism, the combination with an internal combustion engine for propelling the vehicle or vehicles, having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said suction actuated device to the brake mechanism, a tubular suction connection from the said cylinder connected with said suction passage between the throttle valve and said air inlet, a normally open air restricting valve for said suction passage interposed between said suction connection and said air inlet, a valve operating means for the throttle valve including an oscillating part for effecting the opening of the throttle valve by a movement in either direction, and having a limited amount of movement in an intermediate position between its extremities of movement, without effecting the opening of the throttle valve, an oscillating part operatively connected with the air restricting valve and connected with the first mentioned oscillating part, to effect the closing of the air restricting valve during the limited ineffective movement of said first mentioned oscillating part, a foot operated part connected with said oscillating parts, yielding retracting means connected with said oscillating parts, and a hand operated part connected with said oscillating parts by means providing a limited amount of lost motion.

15. In a brake system for automotive vehicles provided with brake mechanism, the combination with an internal combustion engine for propelling the vehicle or vehicles, having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said actuator to the brake mechanism, a tubular suction connection from the said cylinder connected with said suction passage between the throttle valve and said air inlet, a normally open air restricting valve for said suction passage interposed between said suction connection and said air inlet, a valve operating means for the throttle valve including an oscillating part for effecting the opening of the throttle valve by a movement in either direction, and having a limited amount of movement in an intermediate position between its extremities of movement, without effecting the opening of the throttle valve, an oscillating part operatively connected with the air restricting valve and connected with the first mentioned oscillating part, to effect the closing of the air restricting valve during the limited ineffective movement of said first mentioned oscillating part, a foot operated part connected with said oscillating parts, yielding retracting means connected with said oscillating parts, a hand operated part connected with said oscillating parts by means providing a limited amount of lost motion, and means for arresting the air restricting valve in open and in closed position, the connections between said air restricting valve and the second mentioned oscillating part including yielding means to permit the opening of the throttle valve after the closing of the air restricting valve, to expedite the withdrawal of air from the cylinder of the suction actuated device, and the application of the brake mechanism with maximum power.

16. In a brake system for automotive vehicles provided with brake mechanism, the combination with an internal combustion engine for propelling the vehicle or vehicles, having a suction passage provided with an air inlet for supplying the air for the explosive mixture, a carburetor for fuelizing said air, and a throttle valve for said suction passage interposed between said carburetor and the engine cylinders, of a suction actuated device comprising a cylinder and piston, connections from said actuator to the brake mechanism, a tubular suction connection from the said cylinder connected with said suction passage between the throttle valve and said air inlet, a normally open air restricting valve for said suction passage interposed between said suction connection and said air inlet, a controlling rock shaft, an oscillating part thereon connected with the throttle valve and constructed to open said valve by a movement in either direction and having a limited amount of movement in an intermediate position between its extremities of movement without effecting the opening of the throttle valve, an oscillating part on said shaft operatively connected with the air restricting valve and provided with yielding means, means for arresting the air restricting valve in open and also in closed position, a retracting spring for said rock shaft, a hand operated device, means for holding said hand operated device in its adjusted positions, and connections from said hand operated device to said rock shaft, containing a provision for limited lost motion to enable the hand operated device to regulate the position to which said rock shaft will be returned by said retracting spring, and permit the movement of the rock shaft in the opposite direction by the foot operated device.

17. In a brake system for automotive vehicles, the combination with an internal combustion engine for propelling the vehicle or vehicles, having a suction passage provided with an air inlet for supplying the air for the explosive mixture, a carburetor for fuelizing said air and a throttle valve for said suction passage interposed between said carburetor and the engine cylinders, of a suction actuated device, connections therefrom to brake mechanism, a tubular connection from the suction actuated device connected to said suction passage between the throttle valve and said air inlet, a normally open air restricting valve for said suction passage interposed between said tubular connection and said air inlet, operator operated means connected with said throttle valve and said air restricting valve, and operable in one direction to open the throttle valve without closing the air restricting valve, and a retracting spring operatively connected with said valves and operating in a direction to close said throttle valve and close the main air restricting valve to effect an operation of the suction actuated device to apply the brake mechanism connected therewith, whereby in case of the release of the operator operated part by the operator the engine will be automatically throttled down and the brakes applied.

18. In a brake system for automotive vehicles, the combination with an internal combustion engine for propelling the vehicle or vehicles, having a suction passage provided with an air inlet for supplying the air for the explosive mixture, a carburetor for fuelizing said air and a throttle valve for said suction passage interposed between said carburetor and the engine cylinders, of a suction actuated device, connections therefrom to brake mechanism, a tubular connection from the suction actuated device connected to said suction passage between the throttle valve and said air inlet, a normally open air restricting valve for said suction passage interposed between said tubular connection and said air inlet, a foot operated device, a hand operated device, connections between each of said devices and both of said valves including a movable part operable in one direction to open the throttle valve and in the opposite direction to close the throttle valve, and thereafter close the air restricting valve to effect an operation of the suction actuated device by power to apply said brake mechanism, yielding retracting means for said movable part, the connections between said movable part and the said hand operated part containing a provision for lost motion to enable the hand operated device to regulate the position to which the said movable part will be moved by said retracting means, whereby by placing the hand operated part in position to permit said yielding retracting means to effect the closing of the throttle and air restricting valves, the said valves may be controlled by the foot actuated device, and upon the release thereof by the actuator, both valves will be moved by said retracting means into position to apply the brake mechanism with the maximum power.

19. In a brake system for automotive vehicles having an internal combustion engine for propelling the same, provided with a throttle controlled suction passage extending from the air inlet of the carburetor to the engine cylinders, and having a controlling valve for said inlet, the jet nozzle for the carburetor being located between said air inlet valve and the throttle valve, the combination of a suction actuated power cylinder, having its closed end connected with the suction passage between said air inlet and throttle valves and below the carburetor nozzle, valve actuating means operatively connected with the throttle valve and the air inlet valve, constructed to open the throttle valve without closing the air inlet valve to control the speed of the engine, and to effect the closing of the air restricting valve after the throttle is closed to create rarefication within said suction actuated device, for effecting the operation thereof, and physically operable means connected with said valve actuating means.

20. In a brake system for automotive vehicles having an internal combustion engine for propelling the same, provided with a throttle controlled suction passage extending from the air inlet of the carburetor to the engine cylinders, and having a controlling valve for said inlet, the jet nozzle for the carburetor being located between said air inlet valve and the throttle valve, the combination of a suction actuated power cylinder, having its closed end connected with the suction passage between said air inlet and throttle valves and below the carburetor nozzle, valve actuating means operatively connected with the throttle valve and the air inlet valve, constructed to open the throttle valve without closing the air inlet valve to control the speed of the engine, and to effect the closing of the air restricting valve after the throttle is closed to create rarefication within said suction actuated device, for effecting the operation thereof, and physically operable means connected with said valve actuating means, and a second physically operable part connected with said valve actuating means, at least one of said physically operable parts being connected with the valve actuating means by a lost motion connection to permit an independent operation of the valve actuating mechanism by the other physically operable part.

In testimony whereof we affix our signatures.

CALEB S. BRAGG.
VICTOR W. KLIESRATH.